Aug. 28, 1934.  O. W. JOHNSON  1,971,857
DRAFT ELIMINATING DEVICE FOR MOTOR VEHICLE FOOT AND FLOOR BOARDS
Filed June 26, 1933
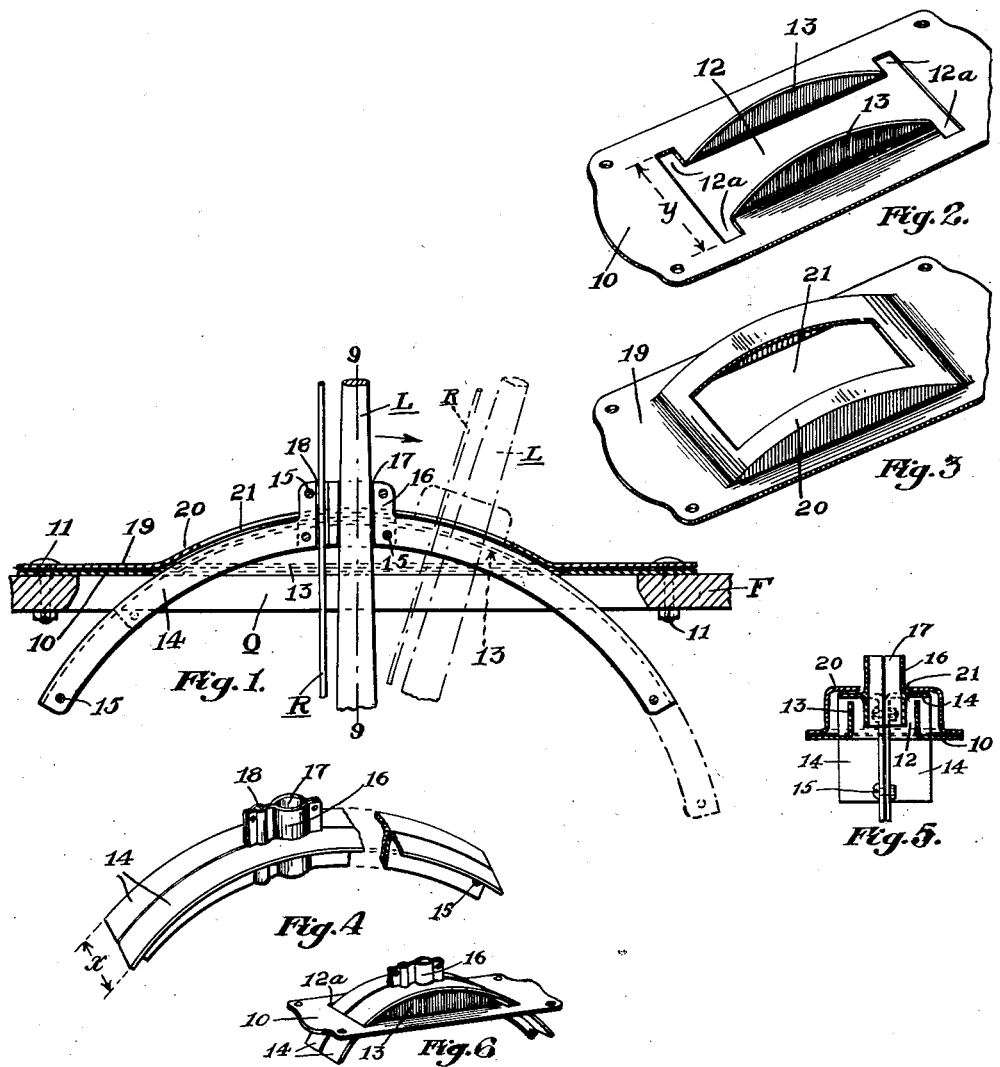
INVENTOR,
Oscar W. Johnson.
BY Henry L. Chenery,
Attorney.

Patented Aug. 28, 1934

1,971,857

UNITED STATES PATENT OFFICE 1,971,857

DRAFT-ELIMINATING DEVICE FOR MOTOR VEHICLE FOOT AND FLOOR BOARDS

Oscar W. Johnson, Portland, Maine, assignor of one-fifth to Joshua J. Bamforth, Portland, Maine Application June 26, 1933, Serial No. 677,544

3 Claims. (Cl. 180—90.6)

The invention hereinafter to be described relates to a device designed to eliminate drafts of air passing into the interior of a motor vehicle body having in its floor board an opening in and through which operates the emergency brake lever for the vehicle.

In cold weather the air passing through the engine compartment and through the slotted portion of the foot and floor boards creates a very disagreeable draft directly onto the persons on the front seat, and in hot weather this air, heated to a still higher temperature by its passing the engine, is wafted into the vehicle to increase the discomfort of its occupants.

As quite a large proportion of the number of motor vehicles are used for pleasure purposes, anything which will add to the comfort of the motorist is desirable.

For this reason I have conceived the present invention the primary object of which is to substantially close the opening in the vehicle board, at least so that no noticeable draft is created when the vehicle is in motion. Furthermore, the invention contemplates the embodiment of structure which in no way interferes with or restricts the movement of the actuating elements hereinbefore mentioned.

In the accompanying drawing I have disclosed a preferred embodiment of my invention calculated to attain the objects sought therein.

In the drawing:—

Fig. 1 is a sectional elevation showing my draft-eliminator as applied to an emergency brake lever;

Figs. 2, 3 and 4 are perspective views, respectively, of the three elements in the structure shown in sectional elevation in Fig. 1;

Fig. 5 is a section on line 5—5, Fig. 1, and

Fig. 6 is a perspective view of the emergency brake draft eliminator, with the cover removed.

Similar reference characters are employed to identify like parts in all views of the drawing.

Referring to the drawing, F represents the floor board of a motor vehicle. As motor vehicle control elements, such as pedals and brakes, are conventional structure, I have in the present instance, shown so much of them only as will comprehensively connect my invention therewith.

In my emergency brake draft eliminator I provide a base plate member 10 secured to the floor board F, over the opening O therein, by bolts 11. The plate 10 has a central, longitudinally disposed opening 12 with a laterally extended portion 12$a$ at each end. On each longitudinal side of the opening 12 is an upstanding plate rail 13 made arcuate on its top edge.

Adapted to ride the arcuate rails 13 is a correspondingly arcuated slot-closing member, made preferably of two angular pieces 14 placed back to back and secured together by bolts or rivets 15. The aggregate width of the two pieces 14, indicated by "$x$", Fig. 4, is slightly less than the dimension "$y$" in Fig. 2. Thus the slot-closing member 14 may oscillate on the tops of the rails 13 and is held laterally in the slots 12$a$, clearly shown in Fig. 6.

Each of the angle members 14 carries half of a hub structure 16 within the opening 17 in which is disposed and secured the emergency brake lever L. The width of the opening 17 is such that when the members 14 are secured together they pinch the lever and bind it therebetween.

This hub structure also has another opening 18 through which the rod R freely passes to actuate the ratchet on the emergency brake (not shown).

Superimposed on the structure as shown in Fig. 6 is a cover 19 having an arcuate raised portion 20 in which is an opening 21 sufficiently wide to permit of the hub portion 16 of the member 14 to pass freely, forwardly and backwardly as the brake is set and released.

The slot-closing member 14 is bent to an arc the radius of which is struck from a center coincident with the pivotal point of the brake lever. And as the portions 13 of the base plate 10, and the raised portion 20 of the cover 19 are formed to arcs struck from the same center, the members 14 are free to oscillate between the rails and cover without interference.

The advantage of motoring in a vehicle equipped with floor boards constructed in such a manner as to prevent drafts of air passing through the engine compartment directly on to one's lower limbs is obvious.

Not alone the draft of air but often gas of a poisonous nature escapes from leaky engine connections and passes with the air into the interior of the vehicle. And as the prevailing type of motor vehicle is that with closed body, and in most cases these vehicles are operated with nearly, if not quite, closed windows, it seems apparent that my equipment would overcome an undesirable and at times a dangerous condition in motoring.

What I claim is:

1. A draft eliminating device for motor vehicles, adapted to be positioned over the emergency brake lever floor-board aperture, comprising a base plate disposed on said floor-board overlapping said aperture, said base plate having an opening therein with lateral extensions on both ends, an arcuate plate rail rising from each longitudinal side of said opening, the arc of said rail being struck from a point coincident with the pivotal point of said emergency brake lever, an arcuate slot-closing member, including two angular elements mutually secured, the horizontal leg portions of said angular elements operating in the lateral extensions in the opening in said base plate, and a split hub structure on said slot-closing member having therein an opening in which said emergency brake lever is adapted to be secured.

2. A draft-eliminating device for motor vehicle floor-boards having an emergency brake lever aperture therethrough, comprising a base plate member, having an opening therein, mounted on said floor-board over said aperture, two arcuate plate rails rising, respectively, from opposite longitudinal sides of the opening in said base plate member, an arcuate slot-closing member adapted to ride said rails whereby it may be oscillated in longitudinal directions, means to secure said slot-closing member to the emergency brake lever of said vehicle, and a cover, having an opening through which said lever-securing means may operate, superimposed on and adapted to partially enclose said slot closing member.

3. In a device of the character described adapted for use on a motor vehicle floor-board having an aperture through which operates the emergency brake lever for said vehicle, the combination, a base plate adapted to be attached to said floor-board, overlapping said aperture, said base plate having an opening extending longitudinally thereof with narrow, lateral extensions of said opening at each end thereof, a plate rail rising from each of the longitudinal sides of said opening, the upper edge thereof being arcuate in contour and drawn to a radius from a center point coincident with the pivotal point from which said emergency brake lever swings, a slot-closing element, including an arcuately bent T shape member, the outstanding portions of which operate on said rails and through the lateral extensions of the base plate opening whereby said slot-closing member is restricted in its side-wise movement, a hub structure on said slot-closing element having a vertically disposed opening in which said emergency brake lever is fixedly secured and another opening through which the ratchet rod for said lever may freely reciprocate, and a cover having an arcuate upwardly extending portion in which is an opening through which said hub structure may oscillate, said cover being attached to said floor board superjacent said base member and said slot-closing element.

OSCAR W. JOHNSON.